Patented Oct. 9, 1951

2,570,182

UNITED STATES PATENT OFFICE 2,570,182

PROCESS OF MAKING CELLULAR MATERIAL

Lawrence E. Daly, Mishawaka, and Robert W. Pooley, South Bend, Ind., assignors to United States Rubber Company, New York, N. Y., a corporation of New Jersey No Drawing. Application July 23, 1948, Serial No. 40,428

4 Claims. (Cl. 260—2.5)

This invention relates to a lightweight, closed-cell, cellular material capable of supporting relatively large loads in comparison to its density and to the process of making same. More particularly the invention relates to such a closed-cell, cellular material that is elastic and resilient and is composed essentially of a vulcanized gas-expanded homogeneous blend of a selected resinous polymer, a selected rubbery copolymer, and a plasticizer or combination of plasticizers. The lightweight, cellular product of our invention absorbs less than 10% of moisture when submerged in water for 72 hours and being soft and resilient is an ideal filler for life-saving jackets, buoyant cushions, etc. The cellular material made in accordance with the present invention also has remarkable shock absorbing properties. For example, an egg can be dropped from a height of thirty or forty feet upon a slab of the product of our invention approximately one inch thick without damaging the egg shell. It can readily be seen that a material of this type will find wide use as shock absorbing pads in airplanes, automobiles, taxi cabs, linings for safety and football helmets, etc. Other uses for the material of the present invention will be obvious from a reading of the following description thereof. The present invention possesses both process and product aspects since we believe that we have developed a new and unique method of processing a combination of selected resins, particularly vinyl ester resins, with the Buna N synthetic rubbers and plasticizers and believe that we have obtained by this process a cellular product having a combination of physical properties never before achieved.

There are described in the literature cellular products made with plastisols of the vinyl ester resins and blowing agents. These plastisols are all sticky, soft and extremely hard to handle in factory operations and it is almost impossible to make large size sheets of cellular material with these pastes or plastisols due to the complications involved in uniformly filling molds therewith. We have discovered a method of processing which completely eliminates the disadvantages of working with such plastisols. Our processing procedure involves only handling and processing a material having the same dry characteristics and physical properties which are exhibited by ordinary elastic rubber stock. The economies effected by our method will be apparent from the following description, especially when production of large quantities of cellular material is undertaken.

We have discovered that a lightweight, closed-cell, cellular material capable of supporting relatively large loads in comparison to its density and which is elastic and resilient may be prepared in a highly advantageous manner by dispersing at a temperature of not over 100° F. a solid resinous polymer of at least one compound containing the $CH_2=C<$ group, particularly polyvinyl chloride or a copolymer of vinyl chloride and vinyl acetate, and a plasticizer in a rubbery copolymer of a butadiene-1,3 hydrocarbon and an alpha methylene nitrile in such manner that substantially no solution by the plasticizer of either the resinous polymer or the rubbery copolymer takes place. This dispersing step yields a dry moldable mixture which is completely free from stickiness, which has been a major difficulty with plastisols, and wherein the rubbery copolymer constitutes the continuous phase and the resinous polymer and the plasticizer constitute the discontinuous or dispersed phase. There is also included in the mixture either before, during or subsequent to the dispersing step a chemical blowing agent and an ingredient or ingredients for effecting vulcanization of the rubbery copolymer component of the mixture. This mixture is then shaped and the shaped mixture is thereafter heated to effect decomposition of the blowing agent and expansion of the mixture, vulcanization of the rubbery copolymer and fusion of the resinous polymer, the rubbery copolymer and the plasticizer into a uniform homogeneous blend.

We often prefer to mold the stock in miniature by substantially filling a mold cavity with the dry moldable mixture, to heat the mixture in the mold under pressure to a temperature sufficiently elevated to effect decomposition of the blowing agent and fusion of the resinous polymer and the rubbery copolymer and the plasticizer into a homogeneous blend, to cool the resulting gassed shape in the mold, to remove the shaped miniature article from the mold and to heat it outside the mold to a temperature not in excess of 250° F. but sufficiently elevated to effect expansion of the miniature shape to final form and to complete vulcanization of the rubbery copolymer which was begun during the gassing operation.

The synthetic resin used in practicing our invention may be any normally solid resin obtained by the polymerization of one or more compounds containing the group $CH_2=C<$ and which is compatible with Buna N, examples being polyvinyl chloride, polyvinyl acetate, copolymers of vinyl chloride and vinyl acetate, polyvinylidene chloride, copolymers of vinylidene chloride and vinyl chloride, polyvinyl ethers, polyacrylic esters, polyvinyl propionate, copolymers of the monomers named, etc. Modifications such as polyvinyl alcohol, polyvinyl acetal and the partial polyvinyl acetals may also be used. We prefer to employ polyvinyl chloride and copolymers of vinyl chloride and another vinyl compound, particularly vinyl acetate, wherein the vinyl chloride predominates, especially copolymers made from 85–95% vinyl chloride and correspondingly from 15–5% vinyl acetate.

As the rubbery component of our mixture, we may employ any synthetic rubbery copolymer of a butadiene-1,3 hydrocarbon and an alpha methylene nitrile, especially rubbery copolymers of butadiene-1,3 and acrylonitrile which are known as Buna N and are made by aqueous emulsion polymerization. Instead of butadiene-1,3 we may use one or more other butadiene-1,3 hydrocarbons such as isoprene, piperylene, dimethyl butadiene-1,3 and the like. Instead of acrylonitrile we may use one or more alpha methylene nitriles of the general formula

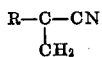

where R is an alkyl group, especially a lower alkyl group such as methyl, ethyl or propyl. The relative proportions of the butadiene-1,3 hydrocarbon and the nitrile which enter into the rubbery copolymer may vary within known limits for producing rubbery copolymers. For example, we find it very convenient to use a rubbery copolymer containing from 50 to 85% of combined butadiene-1,3 and correspondingly from 50 to 15% of combined acrylonitrile, examples of typical rubbery copolymers of this type being made by polymerizing butadiene-1,3 and acrylonitrile in the ratios: 75 butadiene-acrylonitrile 25, 67 butadiene-acrylonitrile 33, 55 butadiene-acrylonitrile 45.

As the plasticizer, we may use any high-boiling organic liquid which is compatible with Buna N and with the resinous polymer employed. The plasticizer should be one which is substantially a non-solvent for the Buna N and for the resinous polymer at temperatures of not over 100° F. so that no fusion of the three principal components of our mixture takes place until the gassing step. The plasticizer should be one capable of dissolving the resinous polymer at moderately elevated temperature, say at temperatures of from 250° to 300° F. Any of the plasticizers commonly used in the manufacture of plastisols may be employed, the principles of making plastisols now being well known in the art. The resin is almost invariably in the form of a powdered solid which is mixed with the plasticizer to form a paste-like dispersion, with or without other components, which dispersion is dispersed as the discontinuous phase throughout the rubbery copolymer as the continuous phase.

The plasticizers which we prefer to employ in our process are the high-boiling esters, ethers and ketones, examples being tricresyl phosphate, dibutyl phthalate, di-2-ethylhexyl phthalate, butyl phthalyl butyl glycolate, dibutyl sebacate, etc.

The proportions of resinous polymer, rubbery copolymer and plasticizer employed in practicing our invention may vary widely depending upon the properties desired in the product and upon other factors. Generally we employ from 10 to 60% of the resinous polymer, from 16 to 80% of the rubbery copolymer and from 20 to 60% of the plasticizer, these percentages being by weight based on the weight of these three ingredients and totaling 100%. In the ordinary practice of our invention we use a ratio of resinous polymer to rubbery copolymer ranging from 3:1 to 1:3 and we use a proportion of plasticizer ranging from 50 to 100%, and more commonly from 60 to 80%, by weight based on the weight of the resinous polymer used.

As the chemical blowing agent used in the practice of our invention, we prefer to use those which liberate nitrogen gas, such as alpha, alpha-azo-bisisobutyronitrile, which is often known as azo isobutyric dinitrile, dinitroso pentamethylene tetramine, diazoaminobenzene, 1,3-bis(o-xenyl)-triazene, 1,3-bis(p-xenyl)-triazene, etc. Less preferably we may use chemical blowing agents which produce gases other than nitrogen, such as ammonium carbonate, ammonium bicarbonate, sodium carbonate, mixtures of sodium bicarbonate and a fatty acid such as oleic acid, mixtures of ammonium chloride and sodium nitrite, etc.

The amount of the blowing agent used may vary widely depending upon the particular blowing agent employed and the proportion thereof which is used. Generally we prefer to use an amount of blowing agent ranging between 10 and 20% by weight based on the sum of the weights of resinous polymer, rubbery copolymer and plasticizer.

The temperature used in the gassing step should of course, be sufficiently elevated to effect thermal decomposition of the blowing agent with attendant liberation of the blowing gas. The temperature will depend upon the blowing agent employed and will usually be substantially above 200° F. We often prefer to use in this step a temperature of at least 250° F. ranging upwardly therefrom to 325° F.

In the practice of our invention wherein the premolded miniature object is heated outside the mold to effect expansion to final form, it is important that the temperature to which the composition is heated in this final heating step should not exceed 250° F. for the reason that higher temperatures rupture the cells and increase the degree of water absorption.

Any of the conventional vulcanizing agents, compounding agents, fillers, pigments, etc. commonly used in the rubber industry may be incorporated in the mixture. We generally prefer to employ sulfur as a vulcanizing agent in conjunction with known vulcanization accelerators and activators. We also may include conventional anti-oxidants for the rubbery component of our mixture. We may also include in the mixture known stabilizers for the resinous polymer such as calcium stearate, lead stearate, etc.

The product produced by our process is characterized by having a density of not over 7 pounds per cubic foot, a compressive resistance of at least 0.8 pound per square inch at 25% compression and a water absorption figure of less than 10% of its weight when it is submerged in water for 72 hours. By following the principles of our invention, there may easily be obtained a product having a density of not over six pounds per cubic foot and exhibiting a compressive resistance of at least 3 pounds per square inch at 25% compression. The product is exceptionally soft and resilient and is highly elastic so that it rapidly resumes its original shape after deformation.

Our process eliminates the objectionable features incident to fluxing of plasticizers and resins attendant upon the prior art practice with plastisols. It also eliminates the necessity for blending the resin and the nitrile rubber in advance at an elevated temperature. In our process these operations are all effected in a relatively short time and without difficulty. We are also able to produce by our method a superior product.

In order to further illustrate the details of our process, we describe the preparation of a lightweight, multi-cellular material that is suitable for use as a buoyant filler for life-saving jackets.

EXAMPLE I

| #1-A Master Batch | Parts by Weight |
|---|---|
| Buna N Synthetic Rubber (Butadiene 55%, Acrylonitrile 45%) | 100 |
| Stearic Acid | 2 |
| Zinc Oxide | 5 |
| Zinc Diethyl Dithiocarbamate | 1 |
| Benzothiazyl Disulfide | 3 |
| Sulfur | 1.6 |
| #1-A Master Batch Total | 112.6 |

| #1-B Master Batch | Parts by Weight |
|---|---|
| Copolymer of Vinyl Chloride 90%, Vinyl Acetate 10% | 100 |
| Dibutyl Sebacate | 35 |
| Dioctyl Phthalate | 35 |
| Calcium Stearate | 2 |
| Titanium Dioxide | 14 |
| Calcium Silicate | 25 |
| Azo Isobutyric Dinitrile | 40 |
| #1-B Master Batch Total | 251 |
| Example I—Net Total | 363.6 |

It will be noticed that Example I is composed of master batch 1-A and master batch 1-B.

Master batch 1-A is the continuous phase or the carrier for master batch 1-B. Master batch 1-B in our process is the dispersed phase of the composition during all processing operations.

Master batch 1-A is mixed on a standard rubber mill, Banbury mixer or other suitable device. Master batch 1-B is then added to master batch 1-A, the vinyl chloride-vinyl acetate copolymer and other pigments being mixed (stirred together) in a suitable container before being added to master batch 1-A. The mixing operation is accomplished in a relatively short time (15 minutes or less) and the mixing equipment is maintained at room temperature. The composition at this stage is dry and soft and is not in any sense of the word sticky. Slabs of the completed mix may be laid one on the other and will not adhere to each other. The composition is not "nervy" and may be calendered to any desired gauge or extruded, injection molded or formed in any other device at normal room temperatures.

A calendered sheet of this composition approximately three-eighths of an inch thick, fourteen inches long and six and a quarter inches wide is placed in a mold having the same volume as the sheet. The mold containing the composition is placed in a platen press that is capable of exerting at least 200 pounds per square inch pressure over the entire area of the mold. The mold is then heated to approximately 300° F. for 20 minutes by steam pressure or other means and the mold containing the composition then cooled to approximately 80° F. The molded composition is removed from the press and also from the mold and an immediate expansion of the composition is quite noticeable.

The composition is then placed in an oven maintained at 240° F. for 20 minutes. The composition expands considerably during the oven heating period and reaches its maximum volume during the first 5-10 minutes of the second heating cycle. The volume increase is approximately 1200%. The vulcanization of the rubber phase of the fused composition is further effected while the material is maintained in this expanded state and during the time the composition is expanded to its maximum volume.

A very lightweight, closed-cell material is thus produced that has not only good heat stability but is exceptionally soft and resilient and has a density of from 4-5 pounds per cubic foot.

The fusion of the vinyl ester resins, the plasticizers and the nitrile rubbers in our process is effected during the initial molding and gassing operation, the result being the blending into a homogeneous composition of all of the synthetic materials and other ingredients in one simple and inexpensive operation. The fusion of these materials is effected not only by the application of heat from the platens of the press but is further aided by the exothermic reaction of the blowing agent. This exothermic reaction also shortens the time necessary to obtain complete fusion of the resins and plasticizers. Of equal importance, the fusion of the materials is also effected in a container or mold from which air is excluded. This minimizes the tendencies of these synthetic materials to absorb oxygen as would occur were the resin and rubber fused on hot mills or in hot Banburys.

The following recipes will further illustrate our

| | Example | | | | | | | |
|---|---|---|---|---|---|---|---|---|
| | II | III | IV | V | VI | VII | VIII | IX |
| *A Master Batch* | | | | | | | | |
| Buna N Synthetic Rubber (Butadiene 55%, Acrylonitrile 45%) | 50 | 150 | 100 | 50 | 150 | 100 | 50 | 150 |
| Stearic Acid | 1 | 3 | 2 | 1 | 3 | 2 | 1 | 3 |
| Zinc Oxide | 2.5 | 7.5 | 5 | 2.5 | 7.5 | 5 | 2.5 | 7.5 |
| Zinc Diethyl Dithiocarbamate | 0.5 | 1.5 | 1 | 0.5 | 1.5 | 1 | 0.5 | 1.5 |
| Benzothiazyl Disulfide | 1.5 | 4.5 | 3 | 1.5 | 4.5 | 3 | 1.5 | 4.5 |
| Sulfur | 0.8 | 2.4 | 1.6 | 0.8 | 2.4 | 1.6 | 0.8 | 2.4 |
| A Master Batch Total | 56.3 | 168.9 | 112.6 | 56.3 | 168.9 | 112.6 | 56.3 | 168.9 |
| *B Master Batch* | | | | | | | | |
| Copolymer of Vinyl Chloride 90%, Copolymer of Vinyl Acetate 10% | 150 | 50 | | | | | | |
| Copolymer of Vinyl Chloride 95%, Copolymer of Vinyl Acetate 5% | | | 100 | 150 | 50 | | | |
| Polyvinyl Chloride 100% | | | | | | 100 | 150 | 50 |
| Dibutyl Sebacate | 53 | 18 | 35 | 53 | 18 | 35 | 53 | 18 |
| Dioctyl Phthalate | 53 | 18 | 35 | 53 | 18 | 35 | 53 | 18 |
| Calcium Stearate | 3 | 1 | 2 | 3 | 1 | 2 | 3 | 1 |
| Titanium Dioxide | 14 | 14 | 14 | 14 | 14 | 14 | 14 | 14 |
| Calcium Silicate | 25 | 25 | 25 | 25 | 25 | 25 | 25 | 25 |
| Azo Isobutyric Dinitrile | 40 | 40 | 40 | 40 | 40 | 40 | 40 | 40 |
| B Master Batch Total | 338 | 166 | 251 | 338 | 166 | 251 | 338 | 166 |
| Net Total | 394.3 | 334.9 | 333.6 | 394.3 | 334.9 | 333.6 | 394.3 | 334.9 | process. Tables I to V below illustrate the physical properties of the cellular materials produced in regard to compressive resistance values, density and water absorption characteristics in comparison with cellular rubber materials of the prior art.

It will be noted that cellular materials produced by our process have very high compressive resistance values in relationship to density when compared to similar materials such as chemical sponge rubber, latex foam sponge, etc. It can also be noted that the water absorption characteristics of the closed-cell, cellular materials of our invention are very low due to the unique processing methods used in making the cellular resilient products.

Table I

| Product of— | Density | Compressive Resistance at 25% Compression |
|---|---|---|
|  | Lbs./cu. ft. | Lbs./sq. in. |
| Example I | 4.5 | 1.6 |
| Example II | 5.9 | 0.8 |
| Example III | 4.2 | 2.9 |
| Example IV | 5.4 | 4.2 |
| Example V | 6.0 | 3.9 |
| Example VI | 5.4 | 4.5 |
| Example VII | 5.1 | 3.8 |
| Example VIII | 5.1 | 3.9 |
| Example IX | 4.9 | 4.3 |

Table II

| Product [1] | Density | Compressive Resistance at 25% Compression |
|---|---|---|
|  | Lbs./cu. ft. | Lbs./sq. in. |
| Medium Modulus Foamed Rubber Sponge | 7.2 | 0.6 |
| High Modulus Foamed Rubber Sponge | 8.6 | 0.9 |
| Foamed Neoprene Sponge | 9.6 | 0.5 |

[1] All of these products are of the open-cell type.

Table III

| Product [2] | Density | Compressive Resistance at 25% Compression |
|---|---|---|
|  | Lbs./cu. ft. | Lbs./sq. in. |
| Medium Density Chemically Blown Rubber Sponge | 10.3 | 0.8 |
| High Density Chemically Blown Rubber Sponge | 17.7 | 3.5 |
| High Density Chemically Blown GR-S Sponge | 15.4 | 1.9 |

[2] All of these products have a substantially complete open-cell structure.

Table IV

Water absorption data for lightweight, closed-cell material produced according to Example I.

| Total Hours Immersion | 0 | 24 | 48 | 72 | 96 | 120 | 144 | 168 |
|---|---|---|---|---|---|---|---|---|
| Weight of Sample (grams) | 31.0 | 32.8 | 32.9 | 33.2 | 33.4 | 33.7 | 33.9 | 34.6 |
| Per Cent Weight Increase Due to H₂O Absorption |  | 5.8 | 6.1 | 7.1 | 7.7 | 8.7 | 9.3 | 11.6 |

Table V

Water absorption data for high density chemically blown rubber sponge (cf. Table III).

| Total Hours Immersion | 0 | 24 | 48 |
|---|---|---|---|
| Weight of Sample (grams) | 33.0 | 39.4 | 40.6 |
| Per Cent Weight Increase Due to H₂O Absorption |  | 19.4 | 23.0 |

NOTE.—Samples used for obtaining the test data in Tables IV and V were prepared so that 38% of the total surface area consisted of freshly cut cellular structure, the remaining surface area being a continuous, smooth surface. The samples were totally immersed in freshly boiled and cooled distilled water for the time intervals shown.

Having thus described our invention, what we claim and desire to protect by Letters Patent is:

1. The process of making a lightweight, closed-cell cellular material which is capable of supporting relatively large loads in comparison to its density and which is elastic and resilient which comprises dispersing at a temperature of not over 100° F. a paste-like dispersion of a finely divided solid plasticizable resinous polymer of at least one compound containing the $CH_2=C<$ group in high boiling organic liquid plasticizer which is substantially a non-solvent for said resinous polymer and for the rubbery copolymer hereinafter mentioned at temperatures of not over 100° F. but is capable of dissolving said resinous polymer and said rubbery copolymer at elevated temperatures above 100° F. at which the chemical blowing agent hereinafter mentioned decomposes, as the discontinuous phase throughout a rubbery copolymer of a butadiene-1,3 hydrocarbon and an alpha methylene nitrile selected from the group consisting of acrylonitrile and its homologues as the continuous phase, said rubbery copolymer and said resinous polymer being mutually compatible and thereby obtaining a dry moldable mixture free from stickiness and wherein said rubbery copolymer constitutes the continuous phase and said paste-like dispersion of said resinous polymer and said plasticizer constitutes the disperse phase, including in the mixture a chemical blowing agent and material for vulcanizing the rubbery copolymer, shaping said mixture, and subsequently heating the shaped mixture and effecting decomposition of the blowing agent and expansion of the mixture to closed-cell cellular form, fusion of the resinous polymer, the rubbery copolymer and the plasticizer into a uniform homogeneous blend, and vulcanization of said rubbery copolymer.

2. The process of claim 1 wherein said dry moldable mixture is heated in a mold under pressure to a temperature at which the blowing agent decomposes to effect decomposition of the blowing agent and fusion of the resinous polymer, the rubbery copolymer and the plasticizer to a homogeneous blend, cooled, removed from the mold and expanded to final form and vulcanized by heating outside the mold at a temperature of not over 250° F.

3. The process of claim 1 wherein the relative proportions of said resinous polymer, said rubbery copolymer and said plasticizer range from 10% to 60% of said resinous polymer, from 16% to 80% of said rubbery copolymer and from 20% to 60% of said plasticizer, said percentages being by weight based on the sum of the weights of said three ingredients.

4. The process of making a lightweight closed-cell cellular material which is capable of supporting relatively large loads in comparison to its density and which is elastic and resilient which comprises dispersing at a temperature of not over 100° F. a paste-like dispersion of a finely divided solid plasticizable resinous copolymer of vinyl chloride and vinyl acetate in a high-boiling organic liquid plasticizer which is substantially a nonsolvent for said resinous copolymer and for the rubbery copolymer hereinafter mentioned and at elevated temperatures of not over 100° F. but is capable of dissolving said resinous copolymer and said rubbery copolymer at elevated temperatures above 100° F. at which the chemical blowing agent hereinafter mentioned decomposes, said paste containing a chemical blowing agent, as the discontinuous phase throughout a rubbery copolymer of butadiene-1,3 and acrylonitrile as the continuous phase, and thereby obtaining a dry moldable mixture free from stickiness and wherein said rubbery copolymer constitutes the continuous phase and said paste-like dispersion of said resinous copolymer and said plasticizer constitutes the disperse phase, including in the mixture material for vulcanizing said rubbery copolymer, substantially completely filling a mold cavity with the resulting dry moldable mixture, heating the mixture in the mold while under pressure to a temperature sufficiently elevated to effect decomposition of the blowing agent and fusion of said copolymers and said plasticizer into a homogeneous blend, cooling and removing the shaped article from the mold and heating it outside the mold to a temperature of not over 250° F. but sufficiently elevated to effect expansion of the mixture and to complete vulcanization of said rubbery copolymer.

LAWRENCE E. DALY.
ROBERT W. POOLEY.

REFERENCES CITED

The following references are of record in the file of this patent:

UNITED STATES PATENTS

| Number | Name | Date |
| --- | --- | --- |
| 2,250,192 | Cuthbertson | July 22, 1941 |
| 2,268,621 | Roberts et al. | Jan. 6, 1942 |
| 2,330,353 | Henderson | Sept. 28, 1943 |
| 2,386,995 | Wigal | Oct. 16, 1945 |
| 2,447,056 | Cooper | Aug. 17, 1948 |
| 2,525,880 | Feldman | Oct. 17, 1950 |

OTHER REFERENCES

De Bell et al.: German Plastics Practice, published 1946 by De Bell and Richardson, Springfield, Mass., pp. 458–461.

Copper Plastics Institute Transactions, April 1948, pp. 51–72.

Young et al.: pp. 1446–1452 Ind. & Eng. Chem., November 1947.

Emmett, pp. 730–734, Ind. & Eng. Chem., August 1944.